April 20, 1965  R. M. NELDEN  3,178,889
FLUID COUPLING
Filed Aug. 27, 1962

INVENTOR.
RICHARD M. NELDEN
BY
WILSON, SETTLE & CRAIG
ATTORNEYS

United States Patent Office 3,178,889
Patented Apr. 20, 1965

3,178,889
FLUID COUPLING
Richard M. Nelden, Birmingham, Mich., assignor to American Radiator & Standard Sanitary Corporation, New York, N.Y., a corporation of Delaware
Filed Aug. 27, 1962, Ser. No. 219,513
4 Claims. (Cl. 60—54)

This application is a continuation-in-part of copending application Serial No. 762,489, filed September 22, 1958, now abandoned and re-filed as continuation application Serial No. 221,926, filed August 13, 1962.

This invention relates to fluid couplings, and more particularly to improved fluid couplings having load-limiting characteristics to ensure operation within safe limits.

More particularly, this invention relates to a fluid coupling provided with means producing a faster unloading response to curtail overload conditions, than heretofore known in the art, thus providing a more durable coupling.

The problem

Fluid couplings are advantageously interposed between driving and driven units to provide a cushioned drive, free from excessive torque surges, impulses and vibrations. With the aid of fluid couplings, it is possible to gradually accelerate a driven shaft from a full running driving shaft; and this is a particularly desirable factor when starting heavy loads because it is possible to apply torques gradually after the driving member is operating at full speed. It will thus be apparent that in the driving of heavy equipment where large centrifugal loads are involved, the driving member, such for example as an electric motor, can quickly be brought to optimum operating speed and the load gradually imposed on the driving motor by progressively increasing the quantity of driving liquid in the coupling to increase the torque-transmitting capacity.

However, in the operation of such devices, it is desirable to protect the driving and driven devices from injury; thus, it is desirable to provide means for quickly limiting the torque-transmitting capacity of a coupling as, when a sudden overload condition is encountered.

Accordingly, an important step forward in the art would be provided by a fluid coupling capable of transmitting a full torque load under normal operating conditions, but also capable of being quickly unloaded during sudden overload surges to protect both the coupling and the driving and driven elements against harm. Further, an advance in the art would be provided by a fluid coupling of simple design with easily and economically formable parts; that provided extremely quick and responsive unloading during overload surges; and that operated as a highly efficient torque transmitter.

The objects

Accordingly, an important object of the present invention is to provide a fluid coupling having novel torque-limiting characteristics operable in such a manner that as the load imposed on the turbine increases, the torque-transmitting capacity of the coupling is automatically limited to a safe operating value.

A further object is to provide a fluid coupling having fluid escape means in the runner side of the fluid circuit whereby fluid may be discharged from the circuit when the coupling is subjected to sudden overload conditions.

A still further object of the present invention is to provide an improved fluid coupling having relatively rotatable impeller and turbine members forming a power transmitting circuit, and wherein fluid discharge passages are provided adjacent the inner periphery of the turbine to exhaust fluid from the work circuit when the turbine slows down to a substantially predetermined speed responsive to the overload condition imposed on the coupling.

Another object is to provide an improved fluid coupling having an impeller-turbine power circuit, wherein fluid outlet passages are provided in the turbine to bleed off a portion of the fluid from the circuit when the circulating fluid moves radially inwardly of the circuit full load level.

A further object is to provide a fluid coupling with an automatic torque-limiting control wherein the quantity of fluid in the circuit is a function of the circulation velocity of the fluid.

A further object is to provide a fluid coupling control adapted to eject fluid from the circuit to reduce torque when the driven shaft is subject to sudden overload and thereby slows down.

Another object is to provide a fluid coupling with an overload safety device producing more rapid and positive dumping when the coupling is subjected to overload conditions.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Perspective view

Briefly, the present invention relates to a fluid coupling of the circulating fluid vortex type, including rotatable and opposed impeller and runner units, with overload torque-limiting ports provided in the runner wall radially inward of the full load circuit profile. Exact placement of the ports provides extremely rapid and effective overload torque-limiting by quick dumping. Also, an improved degree of sensitivity is provided; however, only a minor amount of machining to the runner wall is necessary, as contrasted to complex baffle and porting arrangements of the prior art, the prior art arrangements resulting in a much slower response and often damage to the impeller or runner units during sudden, high torque overload.

The environment

Figure 1:
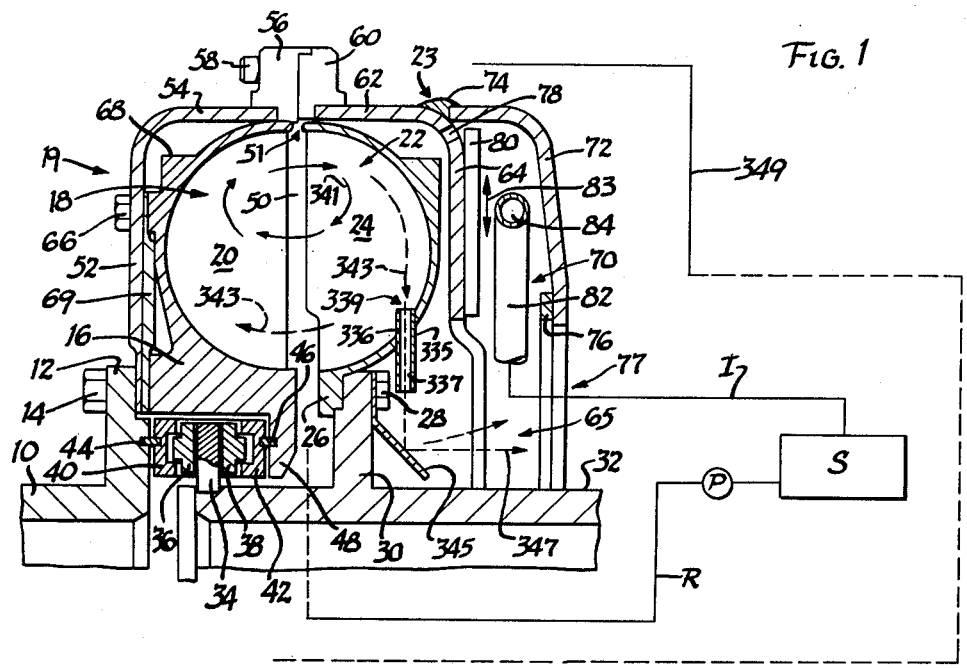
FIGURE 1 is a fragmentary vertical section view showing a fluid coupling constructed in accordance with a first embodiment of the present invention.

Referring now to FIGURE 1, it will be noted that the fluid coupling includes a driving shaft 10, provided with a flange 12, secured as by studs 14 to a hub 16 of an impeller 18 having a plurality of radially extended fluid-energizing vanes 20. A turbine or runner 22 having radially extended vanes 24 is positioned in opposed, adjacent, coaxial alignment to the impeller 18 and is also provided with a hub 26 secured by suitable studs 28 to a flange 30 of a driven shaft 32, positioned coaxial and in alignment with the driving shaft 10. It will be understood that the drive shaft 10 and the driven shaft 32 are rotatably journalled in suitable anti-friction bearings, not shown.

In the typically environmental coupling, a thrust collar 34 is carried on the inner end of the driven shaft 32, and is provided with spaced thrust shoes 36 and 38 held by cages 40 and 42, drivingly connected through suitable drive pins 44 and 46 secured respectively in the flange 12 of the drive shaft 10 and in section 48 of reduced diameter of the impeller hub 16. This mechanism absorbs axial thrust developed between the impeller and turbine members 18 and 22, and maintains the impeller runner gap 50 between the vanes 20 and 24 within a desired operating tolerance.

The impeller 18 is enclosed within a casing 19 defined by radially-extending flange 52 terminating in an axially extending outer section 54 of generally cylindrical shape overlying the outer periphery of the impeller 18. The casing section 54 terminates in a bolting flange 56 secured through cap screws 58 with a bolting flange 60 of an impeller-carried casing 23, also having an axially extending cylindrical section but designated 62 and terminating in a radially extending flange 64 enclosing the back of the turbine 22. It will be noted that the flange 64 has a central eye 65 of circular configuration, coaxial to the driven shaft 32, or the axis of the coupling. This eye is employed for the discharge of fluid during overload, as will be subsequently described.

The inner edge of the flange 52 of the impeller casing 19 is secured to the impeller hub 16 by means of the previously described studs 14, and also by studs 66 positioned radially outwardly of the studs 14 and projecting into a thickened section 68 of the impeller 18. It will be noted that a reinforcing disc 69 is aligned with the inner edge of the flange 52 and is secured by the studs 14 and 66 to reinforce the radial flange wall 52.

The typical fluid coupling shown, in accordance with modern practice, also includes a coaxially disposed scoop tube chamber 70 of annular configuration. The scoop tube chamber 70 is defined by the previously mentioned radial flange 64 with its eye 65, and by an axially spaced radially extending annular flange 72, secured as by welding, illustrated at 74, to the cylindrical section 62 of the casing surrounding the runner 22. The radial flange 72 is suitably provided centrally with a stiffening ring 76 to reinforce the same around a circular eye 77, coaxially aligned with the previously mentioned eye 65 of radial flange 64.

The radial flange 64 is provided in addition at its outer periphery with circumferentially spaced transfer apertures 78, whereby fluid in the scoop tube chamber 70 can flow to the coupling, and vice versa. It should be noted that flow will be through the radial gap 50, as at the point 51, but that the transfer apertures 78 are slightly restricted in size whereby a head may temporarily exist in the scoop chamber 70 greater than the head in the coupling during sudden overload conditions.

To provide acceleration to the ring of liquid existing in the scoop chamber 70, a plurality of radial vanes 80 are secured to the flange 64 within the scoop chamber. These radial vanes 80 maintain the speed of the fluid in the scoop chamber substantially the same as the speed of rotation of the impeller-carried casing 62, 72, 64.

To control the level of fluid in the scoop chamber 70 and in the coupling, a scoop tube 82, provided with means for radial adjustment in the arrow 83 direction as known in the art, is positioned within the scoop chamber. The scoop tube 82 has a fluid inlet 84 to engage the rotating ring of liquid in the scoop chamber 70 and due to the fact that it is stationary relative to the rotation of the scoop chamber and opposes such rotation, is adapted to scoop up fluid from the rotating ring and thereby vary the quantity of fluid in the scoop chamber, depending upon the radial position of the inlet 84. It will be understood that when the inlet 84 is adjusted radially outwardly, to remove fluid from the scoop chamber, fluid will also flow from the working circuit through the gap 50 as at 51 and through the transfer apertures 78 into the scoop chamber, so that the working level will be diminished and thereby the torque transmitting capacity of the coupling can be controlled. Thus, in short, the speed at which the turbine or runner is driven relative to the impeller, or the degree of slip, can be controlled by varying the radial position of the scoop tube 82.

It is to be understood that means known to those skilled in the art is provided for circulating fluid between a sump or reservoir and the fluid circuit. In FIGURE 1 this is shown schematically as including a sump tank S, with an inlet line I connected between it and the scoop tube 82, and a pump P effective to return fluid to the coupling through a line R.

In the operation of fluid couplings, typified by the foregoing, fluid circulates by rotation of the impeller, through the turbine and back from the turbine to the impeller as a rotating vortex. The fluid flowing from the impeller to the turbine travels adjacent the outer peripheries of the two units and returns from the impeller to the turbine along levels spaced radially inwardly, depending upon full load or overload conditions.

When a coupling is transmitting full load torque, the slippage is low; this means that the circulation velocity of the fluid between the impeller and runner is at a minimum. However, when the runner is subjected to a sudden overload, the impeller continues to operate at substantially its same speed while the turbine will be slowed down. This causes the circulation velocity of the liquid to be increased and the degree of slip is thus increased as the turbine overspeeds the runner. This condition forces the fluid to circulate along the inner periphery of the runer and back to the inlet portion of the vanes of the impeller, in a rather violent whirling manner. It is at this point that the overload mechanism of the present invention goes into action and effectively dumps the circuit to reduce the fluid level to a safe torque-transmitting level, thus reducing the dangerous overload and avoiding damage to the unit and to the driven and driving elements as well.

*The invention*

In the embodiment of FIGURE 1, the invention comprises an assemblage of elements that have been given reference numerals in the 300 series, corresponding to the specification of the copending parent application, Serial No. 762,489, filed September 22, 1958.

Thus, a plurality of circumferentially-spaced tubes 335 are positioned in the shell of the turbine or runner 22. The tubes 335 are suitably press-fitted into apertures 336, bored radially through the outer wall of the runner 22. The tubes 335 have internal passages or bores 337 that communicate with the interior of the runner and thus with the fluid circuit to rapidly exhaust fluid during overload conditions from the circuit to and/or through the scoop tube chamber 70. It will be noted that the entrance 339 to the tubes 335 is positioned a sufficient distance from the outer periphery of the turbine to be in the overload circulating vortex, as distinguished from the full load circulating vortex. Thus, when the coupling is operating under normal full load conditions, the fluid flowing in the runner is deflected back to the impeller along an outer transient path designated by the arrows 341. Thus, in this condition of operation of the coupling, the fluid does not contact the entranceway 339 of the tubes 335 and the coupling continues a normal state of full load operation. Thus, the tubes 335 are inoperative at normal speeds and working conditions of the coupling.

However, when the runner 22 slows down, as at high load stall conditions on the output shaft, as when it is subjected to a sudden overload, the vortex fluid circulates much more violently and inwardly along the periphery of the runner and moves radially inwardly as illustrated by the dotted line arrows 343. During this more violent flow, the fluid is thrown into the entranceways 339 of the tubes 335 at a high rate of speed to flow through the internal passages 337 and be discharged radially inwardly to contact a frusto-conical deflector ring 345 and thus be moved in the arrow direction 347 toward the scoop chamber 70, with some of the exhausting fluid being directed into the scoop chamber and some of the fluid being thrown to the eye 77 of the outermost casing element 72 to be collected by or within a surrounding housing 349, surrounding the entire coupling, except for the terminal ends of the drive shaft 10 and the driven shaft 32, for connection to driving and driven elements, not shown, but evident to those skilled in the art. At this point it should be understood that the sump S, line I and return line R can be suitably enclosed within the surrounding housing 349 to provide a very compact unit.

As previously mentioned, the rate of travel of the fluid between the scoop chamber 70 and the work circuit through the transfer aperture 78, is somewhat restricted by the size of the apertures. During the overload condition previously described, this will permit a slight head to be built up in the scoop chamber 70, greater than that in the work circuit, permitting the scoop tube mouth 84 to drink in some of the fluid and exhaust it by line I to the sump S.

By operating in this manner, the torque of the work circuit is substantially instantaneously reduced upon encountering the overload condition, but at least part of the exhausted fluid is diverted to the scoop chamber for return to the circuit immediately, if the overload condition is temporary and disappears. However, if the overload condition is sustained, the fluid level of the coupling will be automatically lowered to a safe operating range.

Figures 2, 3:
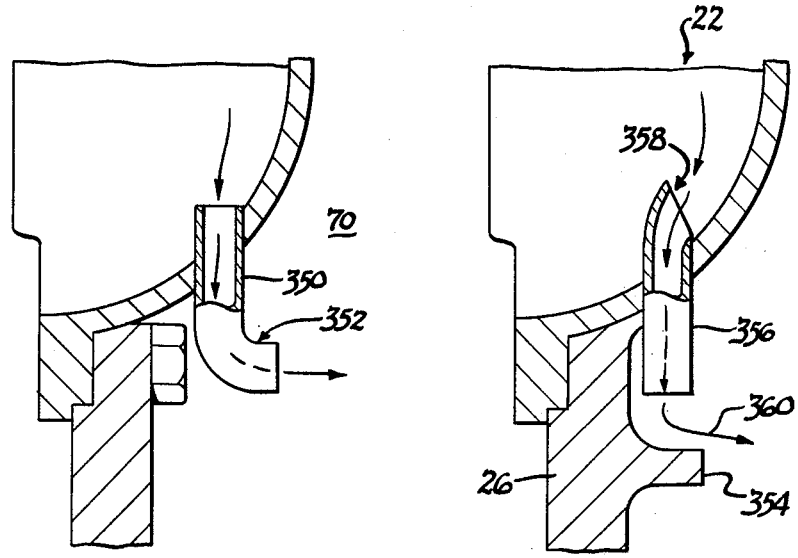
FIGURE 2 is a fragmentary section view of a second embodiment of the invention.
FIGURE 3 is a fragmentary section view of a third embodiment of the invention.

*The embodiment of FIGURE 2*

The environmental surrounding as regards the coupling or the embodiment of FIGURE 2 is the same as that in FIGURE 1. However, it will be noted that the exhaust tubes, designated 350, are provided with a 90° bend at 352, oriented in the direction of the scoop chamber 70 and positioned at a level to direct the fluid through both of the eyes 65 and 77 as shown in FIGURE 1, and thus positively out of the circuit upon an overload condition being encountered.

Thus, in this embodiment of the invention, the frustoconical deflector ring 345 of FIGURE 1 is not necessary and may be omitted.

Substantially the same functional advantages are provided in the embodiment of FIGURE 2 as in the embodiment of FIGURE 1.

*The embodiment of FIGURE 3*

The environmental surrounding of FIGURE 3 is essentially the same as that of FIGURE 1. However, it will be noted that a slight modification is provided to the hub 26 of the runner 22 as at 354, to provide an annular deflector ring forming part of the hub itself. The flow tubes of the FIGURE 3 embodiment are generally the same as those in FIGURE 1; however, it will be noted that a slight modification has been added as follows: Thus, the upper end of the tube 356 has been provided with a slightly overturned scoop mouth 358, oriented in a direction facing fluid flow along the inner periphery of the runner, thus tangential to the inner periphery on the inside. This arrangement provides an extremely efficient pick-up, with lightning-like response in dumping of the circuit during overload.

During overload, the fluid is ejected in the arrow 360 direction through both of the eyes 65 and 77 of the scoop chamber, shown in FIGURE 1, and completely out of the circuit, returning to the pump P for recirculation, as previously set forth, by being caught by the surrounding casing 349.

*Extended scope of invention*

It will be understood from the foregoing that the exact placement of the exhaust outlets of the present invention along the peripheral wall of the runner is subject to variation for the greatest degree of accuracy and control, depending upon the actual configuration of the coupling to which the invention is applied.

The prior description has mentioned that the dump port inserts are tubular. Such terminology is to be understood to include both round and multi-sided tubular elements.

*Advantages of the invention*

From the foregoing it is believed that the advantages of the invention are self-evident; however, to sum up, the advantages are briefly highlighted as follows:

(1) A quick dumping coupling is provided in accordance with the present invention that effectively controls overload conditions to avoid damage to the unit itself or to the driving or driven units which it connects.

(2) It will be understood from the foregoing that the present invention provides a unique fluid coupling overload safety device, but with minimum modification to the coupling itself, the modification taking the form of accurately placed and simply machined exhaust port outlets in the runner. These may be installed either while a coupling is being built, or by modifying existing couplings with only minor disassembly procedures.

(3) The present invention provides a distinct advance over the prior art and a contribution to the art by effective placement of the exhaust passages along the interior periphery of the runner, just outside of the full load fluid level to provide extreme sensitivity to overload conditions. In this connection, it will be noted that no baffle is necessary in the interior of the work circuit of the coupling to add extra expense, as by machining and installation, or to impose a drag of any kind during the operation of the coupling in coming up to full load speed.

I claim:

1. In a fluid coupling having relatively rotatable and juxtaposed vaned impeller and runner shells separated by an annular gap and forming a toroidal work chamber,
   means for supplying hydraulic fluid to the work chamber from an external source,
   a casing surrounding the impeller and runner shells,
   said casing having an opening on the runner shell side coaxial with the axis of rotation of the impeller and runner shells,
   a wall within the casing on the runner shell side defining an annular scoop chamber coaxial to and adjacent said work chamber,
   said wall having a first opening coaxial with said opening in the casing,
   second opening means in said wall adjacent the outer periphery of impeller and runner shells providing limited flow between said scoop and work chambers,
   and a scoop tube radially adjustable in said scoop chamber for exhausting excess fluid back to said external source to control the level of fluid in said scoop chamber and in said work chamber,
   the work chamber being partially filled with fluid which under normal running conditions is located adjacent the outer peripheries of the runner and impeller shells,
   the improvement of
   said runner shell having a radially extending aperture near the inner periphery thereof and spaced from the fluid in the work chamber under normal running conditions,
   a tubular orifice inserted into said aperture to exhaust fluid from said work chamber during overload conditions,
   a portion of said tubular orifice projecting into the work chamber and having an inlet opening facing in a direction opposing fluid flow in the work chamber and an outlet exteriorly of the runner shell,
   and diverting means exterior of the runner shell to deflect fluid issuing from said tubular orifice through said first opening in the wall and the opening in the casing.

2. A fluid coupling as defined in claim 1 and further characterized in that said diverting means comprises a frusto-conical baffle on the exterior of the runner shell in alignment with said outlet and having its axis coaxial to the axis of the coupling, said baffle being angled towards the axis of the coupling to direct the fluid through the first opening in the wall and the opening in the casing.

3. A fluid coupling as defined in claim 1 and further characterized in that said diverting means comprises a 90° bend of the tubular orifice to orient the outlet thereof in aligned relationship to the axis of the coupling and facing towards the first opening in the wall and the opening in the casing.

4. A fluid coupling as defined in claim 1 and further characterized in that said diverting means comprises an annular, axially extending deflector ring carried by said runner shell radially inwardly of the outlet from the tubular orifice, said deflector ring having a curved outer surface adjacent said outlet to direct fluid issuing from said outlet through said first opening in the wall and the opening in the casing.

References Cited by the Examiner

UNITED STATES PATENTS 1,937,364  11/33  Sinclair _____ 60—54

FOREIGN PATENTS 1,016,938  9/52  France.
1,133,580  11/56  France.

EDGAR W. GEOGHEGAN, *Primary Examiner.*

JULIUS E. WEST, *Examiner.*